US012743506B2

(12) United States Patent
Boulgakov

(10) Patent No.: US 12,743,506 B2
(45) Date of Patent: Sep. 22, 2026

(54) INDEXING SOFTWARE PACKAGES AND DETECTING MALICIOUS OR POTENTIALLY HARMFUL CODE USING API-CALL N-GRAMS

(71) Applicant: Google LLC, Mountain View, CA (US)

(72) Inventor: Alexandre Boulgakov, Mountain View, CA (US)

(73) Assignee: Google LLC, Mountain View, CA (US)

( * ) Notice: Subject to any disclaimer, the term of this patent is extended or adjusted under 35 U.S.C. 154(b) by 554 days.

(21) Appl. No.: 18/031,443

(22) PCT Filed: Oct. 12, 2020

(86) PCT No.: PCT/US2020/055191

§ 371 (c)(1),
(2) Date: Apr. 12, 2023

(87) PCT Pub. No.: WO2022/081122

PCT Pub. Date: Apr. 21, 2022

(65) Prior Publication Data

US 2023/0394141 A1 Dec. 7, 2023

(51) Int. Cl.

*G06F 21/55* (2013.01)
*G06F 9/54* (2006.01)
(Continued)

(52) U.S. Cl.

CPC ............ *G06F 21/554* (2013.01); *G06F 9/547* (2013.01); *G06F 16/9024* (2019.01); (Continued)

(58) Field of Classification Search

CPC .... G06F 21/554; G06F 21/563; G06F 21/564; G06F 2221/033; G06F 9/547; G06F 16/9024
See application file for complete search history.

(56) References Cited

U.S. PATENT DOCUMENTS 8,887,286 B2 11/2014 Dupont et al.
9,183,196 B1 * 11/2015 Uszkoreit ............. G06F 40/211
(Continued)

OTHER PUBLICATIONS

Wikipedia. "Breadth-first Search". Sep. 25, 2020. Wikipedia. https://web.archive.org/web/20201003052806/https://en.wikipedia.org/w/index.php?title=Breadth-first_search&oldid=980286415 (Year: 2020).*
(Continued)

*Primary Examiner* — Eleni A Shiferaw

(74) *Attorney, Agent, or Firm* — McDonnell Boehnen Hulbert & Berghoff LLP

(57) ABSTRACT

This document describes systems and techniques for indexing binaries of a software package and detecting potentially harmful code within the software package using API-call n-grams. A computing device generates API-call graphs from binaries. The computing device computes n-grams from the API-call graphs and adds them to an inverted index, which maps the n-grams to a respective identifier. The computing device identifies, using a signature that represents the behavior of the potentially harmful code, a set of candidate API-call graphs. The computing device can then compare, using a matching algorithm, the set of candidate API-call graphs to a non-deterministic finite automaton representation of the potentially harmful code. In this way, the described systems and techniques can use API-call n-grams to efficiently identify whether the software package includes a file that matches the behavior of potentially harmful code.

18 Claims, 8 Drawing Sheets

(51) Int. Cl.
*G06F 16/901* (2019.01)
*G06F 21/56* (2013.01)

(52) U.S. Cl.
CPC .......... *G06F 21/563* (2013.01); *G06F 21/564* (2013.01); *G06F 2221/033* (2013.01)

(56) References Cited

U.S. PATENT DOCUMENTS

| | | | | |
|---|---|---|---|---|
| 9,223,554 | B1 | 12/2015 | Lawson | |
| 9,514,246 | B2 | 12/2016 | Billa et al. | |
| 10,248,547 | B2 * | 4/2019 | Peng | G06F 11/3676 |
| 10,592,324 | B2 | 3/2020 | Puri et al. | |
| 2007/0094734 | A1 * | 4/2007 | Mangione-Smith | G06F 21/564 713/188 |
| 2008/0271147 | A1 | 10/2008 | Mohanan et al. | |
| 2015/0142853 | A1 * | 5/2015 | Tealdi | G06F 16/9024 707/798 |
| 2015/0254172 | A1 * | 9/2015 | Baril | G06F 11/3616 717/128 |
| 2016/0057159 | A1 * | 2/2016 | Yin | H04L 63/145 726/23 |
| 2017/0068816 | A1 * | 3/2017 | Cavazos | G06N 3/084 |
| 2018/0300224 | A1 * | 10/2018 | Peng | G06F 11/3676 |
| 2020/0387377 | A1 * | 12/2020 | Tseng | G06F 9/3853 |
| 2021/0019184 | A1 * | 1/2021 | Vee | G06N 3/105 |

OTHER PUBLICATIONS

Boulgakov, A., Gibson-Robinson, T., Roscoe, A. W. "Computing maximal weak and other bisimulations". May 1, 2016. ACM. Formal Aspects of Computing, vol. 28, Issue 3. p. 381-407. https://doi.org/10.1007/s00165-016-0366-2 (Year: 2016).*

Wressnegger, C., Schwenk, G., Arp, D., Rieck, K. "A close look on n-grams in intrusion detection: anomaly detection vs. classification". Nov. 4, 2013. ACM. AISec '13: Proceedings of the 2013 ACM workshop on Artificial Intelligence and Security. p. 67-76. https://doi.org/10.1145/2517312.251731 (Year: 2013).*

Boulgakov, A. "Efficient multi-graph or rooted subgraph matching via merging". Jun. 18, 2018. Technical Disclosure Commons. https://www.tdcommons.org/dpubs_series/1252 (Year: 2018).*

Boulgakov, A. "Static system-call graph generation". Jun. 21, 2018. Technical Disclosure Commons. https://www.tdcommons.org/dpubs_series/1272 (Year: 2018).*

Desnos, A., Petrova, E., Boulgakov, A., Neal, R., Mithra, Z. "Flow-graph analysis of system calls for exploit detection". Jun. 21, 2018. Technical Disclosure Commons. https://www.tdcommons.org/dpubs_series/1271 (Year: 2018).*

Wikipedia. "Non-deterministic finite automaton". Aug. 4, 2020. Wikipedia. https://web.archive.org/web/20200831083030/https://en.wikipedia.org/w/index.php?title=Nondeterministic_finite_automaton&oldid=971216896 (Year: 2020).*

Schick, T., "Transition-Based Generation from Abstract Meaning Representations". Jul. 27, 2017. arXiv. https://doi.org/10.48550/arXiv.1707.07591 (Year: 2017).*

Boulgakov, A., Ren, C. "A Machine-Learned Model to Detect Malicious Code Using API-call N-grams from Static Analysis". Sep. 10, 2020. Technical Disclosure Commons. https://www.tdcommons.org/dpubs_series/3590 (Year: 2020).*

Boulgakov, A. "Improving Scalability of Exploratory Model Checking". 2016. PHD Thesis. University of Oxford. (Year: 2016).*

Qiu, T., Yang, X., Wang, B., Wang, W. "Efficient Regular Expression Matching Based on Positional Inverted Index". May 13, 2020. IEEE. IEEE Transactions on Knowledge and Data Engineering, vol. 34, Issue 3. p. 1133-1148. https://doi.org/10.1109/TKDE.2020.2992295 (Year: 2020).*

Boulgakov, A. "Matching a graph with a non-deterministic finite automaton". Jun. 14, 2018. Technical Disclosure Commons. https://www.tdcommons.org/dpubs_series/1246 (Year: 2018).*

Boulgakov et al., "A Machine-Learned Model To Detect Malicious Code Using API—A Machine-Learned Model to Detect Malicious Code using API-call N-grams from Static Analysis," Technical Disclosure Commons, Sep. 10, 2020, 9 pages.

Wikipedia, Anonymous: "Nondeterministic finite automaton," URL: https://en.wikipedia.org/wiki/Nondeterministic_finite_automation, Jun. 9, 2021, 10 pages.

* cited by examiner

Generate API-call graphs from binaries of a file
702

Compute n-grams from the API-call graphs
704

Add the n-grams to an inverted index that maps each of the n-grams to a respective identifier of the API-call graphs
706

Identify a set of candidate API-call graphs that match a signature from among the API-call graphs
708

Retrieve the set of candidate API-call graphs from the inverted index
710

Compare, using a matching algorithm, the set of candidate API-call graphs to a NFA
712

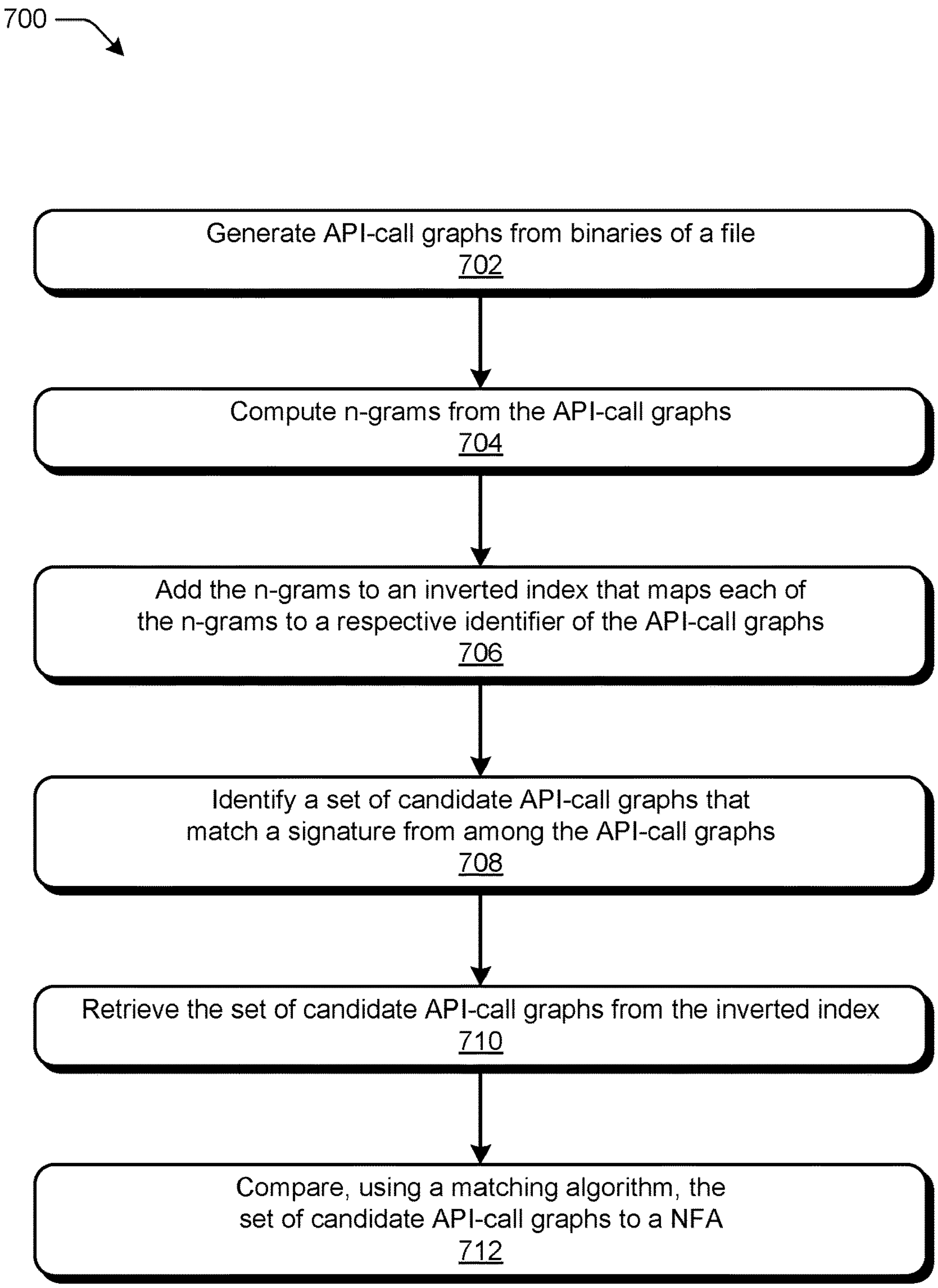

FIG. 7

INDEXING SOFTWARE PACKAGES AND DETECTING MALICIOUS OR POTENTIALLY HARMFUL CODE USING API-CALL N-GRAMS

This application is a national stage application under 35 U.S.C. § 371 of International Application No. PCT/US2020/055191, filed Oct. 12, 2020, the disclosure of which is explicitly incorporated by reference herein in its entirety.

BACKGROUND

Static analysis is a technique to improve computer security where an executable file or shared library file is tested for the presence of malicious or potentially harmful code (collectively referred to as "potentially harmful code" in this document) without running the file. Examples of potentially harmful code include attempts to exploit known vulnerabilities in an operating system. Many techniques to identify potentially harmful code do not scale well for analyzing a large number of software packages and struggle to keep up with a continually changing landscape of potentially harmful software. As an example, some current approaches match each signature (e.g., API-call sequences) against each graph (e.g., API-call graph) for a software package. The process generally includes one graph per binary, with potentially multiple binaries per executable file or shared library file in the software package. The collection of software packages on a user device can result in millions to hundreds of millions of graphs. Therefore, current approaches can take several days to determine whether the collection of software packages includes potentially harmful code, often resulting in too many false positives or false negatives to be useful.

SUMMARY

This document describes systems and techniques for indexing binaries of a software package and detecting potentially harmful code using API-call n-grams. A computing device generates API-call graphs from binaries. The computing device computes n-grams from the API-call graphs and adds them to an inverted index, which maps the n-grams to a respective identifier. The computing device identifies, using a signature that represents the behavior of the potentially harmful code, a set of candidate API-call graphs. The computing device can then compare, using a matching algorithm, the set of candidate API-call graphs to a non-deterministic finite automaton representation of the potentially harmful code. In this way, the described systems and techniques can use API-call n-grams to efficiently identify whether the software package includes a file that matches the behavior of potentially harmful code.

For example, the described systems and techniques generate API-call graphs from binaries of a software package, which can include executable files or shared library files. The systems and techniques compute n-grams from the API-call graphs and add the n-grams to an inverted index, which maps each of the n-grams to a respective identifier of the API-call graph. From among the API-call graphs, the systems and techniques can identify a set of candidate API-call graphs that match a signature. The signature represents behavior of potentially harmful code. The systems and techniques can retrieve the set of candidate API-call graphs from the inverted index. Using a matching algorithm, the systems and techniques then compare the set of candidate API-call graphs to a non-deterministic finite automaton (NFA) representing the behavior of the potentially harmful code. The comparison is effective to detect whether the set of candidate API-call graphs includes a binary that matches the behavior of the potentially harmful code.

This document also describes other methods, configurations, and systems, for indexing software packages and detecting potentially harmful code using API-call n-grams.

This Summary is provided to introduce simplified concepts of indexing software packages and detecting potentially harmful code using API-call n-grams, which is further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of indexing software packages and detecting potentially harmful code using API-call n-grams are described in this document with reference to the following drawings. The same numbers are used throughout multiple drawings to reference like features and components.

FIG. 7 illustrates example operations to index a software package and detect potentially harmful code using API-call n-grams.

DETAILED DESCRIPTION

Overview

Figure 1:
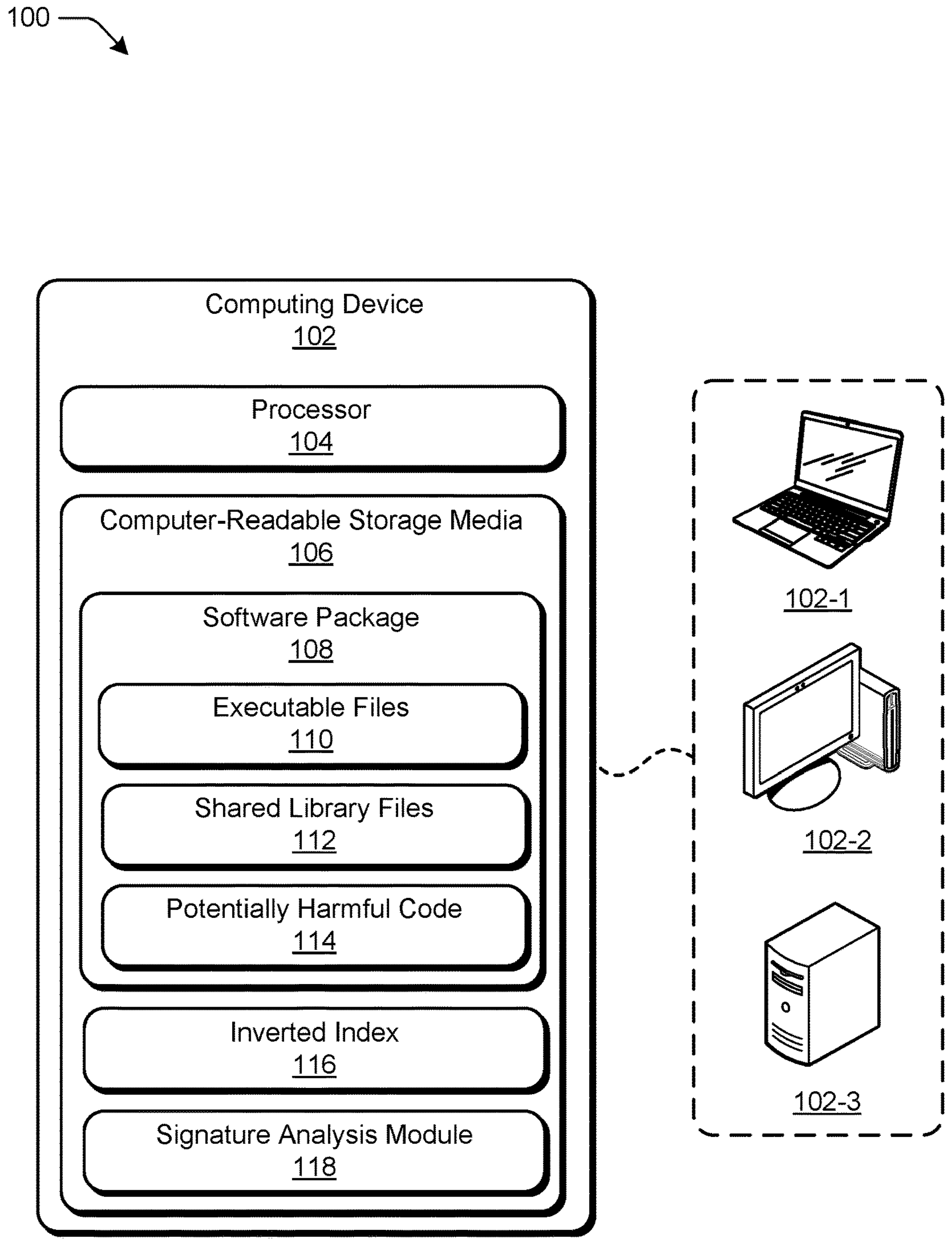
FIG. 1 illustrates an example computing environment for indexing a software package and detecting potentially harmful code.

This document describes indexing a software package and detecting potentially harmful code within the software package using API-call n-grams. Static analysis is a technique to improve computer security by testing executables files or shared library files for the presence of potentially harmful code without running the executable. Examples of potentially harmful code include attempts to exploit known vulnerabilities in an operating system.

Some static-analysis techniques attempt to match API-call sequences (referred to as "signatures" in this document) of potentially harmful behavior against API-call graphs of a software package. These techniques check the executable files for a matching signature. A software package can include one API-call graph per executable file, with many files per software package. As an example, a collection of software packages on a computing device can result in millions to hundreds of millions of API-call graphs. Adding a new signature can trigger a multi-day scan of API-call graphs for the collection of software packages, which may result in too many false positives or false negatives for the signature to be useful in detecting potentially harmful code.

Other techniques allow security engineers to detect potentially harmful code in a software package by using minhashes and nearest-neighbor lookups. These techniques search for a matching code structure rather than similar behavior. Because code variants, trivial code changes, or compiler-version changes for an executable file can change the structure of the code, but not its behavior, these techniques generally fail to keep up with a continually changing landscape of potentially harmful files.

In contrast, the described systems and techniques utilize signatures that represent the behavior of potentially harmful code to effectively detect executable files with similar potentially harmful behavior and efficiently identify potentially harmful code within an inverted index. The described systems and techniques use API-call n-grams to index signatures for a software package, which allows security engineers to find signatures containing n-grams of interest efficiently. Security engineers can then use the inverted index to efficiently retrieve signatures that contain paths matching classes of NFAs with epsilon-moves used in potentially harmful code. In this way, security engineers can scan a collection of software packages for a new signature in several minutes, as opposed to several days, using the described systems and techniques. The described systems and techniques also allow security engineers to run ad-hoc queries in a software package to develop new signatures of potentially harmful behavior.

As a non-limiting example, the described systems and techniques generate API-call graphs from binaries of a software package. The systems and techniques compute n-grams from the API-call graphs and add the n-grams to an inverted index. The inverted index maps each of the n-grams to a respective identifier of the API-call graphs to enable efficient locating of individual API-call graphs. The systems and techniques identify, from among the API-call graphs, a set of candidate API-call graphs that match a signature. The signature represents behavior of potentially harmful code. The systems and techniques retrieve the set of candidate API-call graphs from the inverted index and compare them to an NFA using a matching algorithm. The NFA represents the potentially harmful code. The comparison is effective in detecting whether a file within the software package matches the behavior of potentially harmful code.

This example is just one illustration of how the described indexing of a software package and detecting potentially harmful code using API-call n-grams can improve the security of computer systems. Other example configurations and methods are described throughout this document. This document now describes additional example methods, configurations, and components for the described indexing and detecting of potentially harmful code using API-call n-grams.

Example Devices

FIG. 1 illustrates an example computing environment 100 for indexing a software package 108 and detecting potentially harmful code 114. The computing environment 100 includes a computing device 102.

The computing device 102 can be a variety of computing devices used by security engineers to index the software package 108 and detect the potentially harmful code 114. As non-limiting examples, the computing device 102 can be a laptop computer 102-1, a desktop computer 102-2, or a server 102-3. The computing device 102 can include one or more processors 104 and computer-readable storage media (CRM) 106. The processor 104 can be a single-core processor or a multiple-core processor. The processor 104 functions as a central processor for the computing device 102. The processor 104 can include other components, such as communication units (e.g., modems), input/output controllers, sensor hubs, system interfaces, and the like.

The CRM 106 includes any suitable non-transitory storage device (e.g., random-access memory (RAM), static RAM (SRAM), dynamic RAM (DRAM), non-volatile RAM (NVRAM), read-only memory (ROM), Flash memory) to store device data of the computing device 102. The device data can include user data, multimedia data, an operating system, and applications of the computing device 102, which are executable by the processor(s) 104 to enable communications and user interaction with the computing device 102.

For example, the CRM 106 can include the software package 108 and an inverted index 116. The software package 108 can be, for example, a collection of applications available for download to user devices (e.g., a mobile phone, a tablet device, a laptop computer, a desktop computer). The software package 108 can include millions to hundreds of millions of files, including executable files 110 and shared library files 112. The executable files 110, when executed, can cause a computing device (e.g., a user device) to perform specific tasks according to instructions encoded therein. The shared library files 112 generally contain code that one or more executable files 110 can simultaneously use while executing.

Among the executable files 110 and the shared library files 112, the software package 108 can also include the potentially harmful code 114. In particular, one or more of the executable files 110 and the shared library files 112 can include indicators of potentially harmful code or code that can potentially perform unwanted behavior on a user device.

The computing device 102 uses the systems and techniques described in this document to generate the inverted index 116 of the executable files 110 and the shared library files 112 in the software package 108. The inverted index 116 assists security engineers to detect, using a signature analysis module 118, the potentially harmful code 114. As described in greater detail for FIG. 2, the inverted index 116 includes a mapping of n-grams to respective API-call graphs of the executable files 110 and the shared library files 112. The signature analysis module 118 can then use the inverted index 116 to identify API-call graphs that match the behavior of the potentially harmful code 114.

Figure 2:
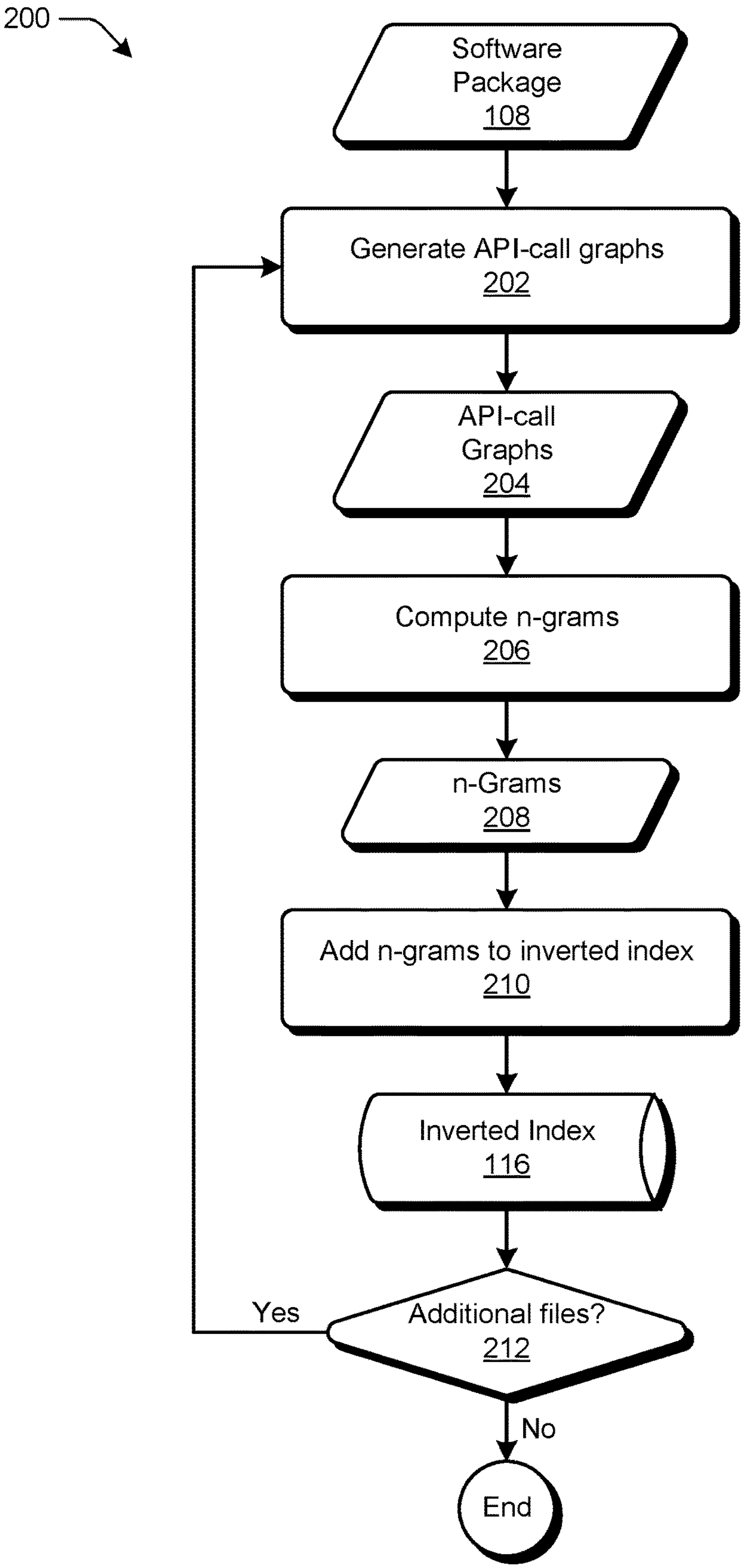
FIG. 2 illustrates an example flow diagram for indexing a software package using API-call n-grams.

FIG. 2 illustrates an example flow diagram 200 for indexing the software package 108 using API-call n-grams. The operations and outputs of the flow diagram 200 are described in the context of the computing device 102 of FIG. 1. The computing device 102 indexes the software package 108 to assist in the identification of potentially harmful code 114. The operations of the flow diagram 200 may be performed in a different order or with additional or fewer operations.

At 202, the computing device 102 generates API-call graphs 204 from binary files of the executable files 110 and the shared library files 112 of the software package 108. The API-call graphs 204 represent an abstraction of the executable files 110 and the shared library files 112. For example, the API-call graphs 204 can represent a sequence of API calls made by an executable file 110 or a shared library file 112. The operation 202 is described in further detail with respect to FIG. 3.

At 206, the computing device 102 computes n-grams 208 from the API-call graphs 204. N-grams are often used in document processing to summarize the content of a document as a set of text fragments. The API-call graphs 204 have document-like content, which is referred to in this document as a grammar. Given a loop in an executable file 110, a grammar can represent a set of execution traces with an arbitrary number of iterations of the loop. The grammar is generally limited to a finite number of n-grams 208 of a given length—$S^N$, where S is the number of symbols in the grammar, and N is the length of the n-grams 208. An artificial intelligence (AI) integrator can use a library to extract the n-grams 208 from the API-call graphs 204 contained in the executable files 110 and the shared library files 112. The computed n-grams 208 can be of a customizable length (e.g., one-gram, two-gram). The operation 206 is described in further detail with respect to FIG. 4.

At 210, the computing device 102 adds the n-grams 208 to the inverted index 116. The inverted index 116 maps the n-grams 208 to identifiers of respective API-call graphs 204 containing the n-grams 208. The inverted index 116 can be used by security engineers or security applications on the computing device 102 to perform queries to identify API-call graphs 204 that contain particular n-grams 208 or combinations thereof. In this way, the computing device 102 can index the executable files 110 and the shared library files 112 of the software package 108 as non-linear or graph-based data.

At 212, the computing device 102 determines whether there are additional or new executable files 110 or shared library files 112 in the software package 108 that are not indexed. If there are additional files, the computing device 102 returns to operation 202. If there are no additional files, the computing device 102 terminates the operations of the flow diagram 200. In other implementations, the computing device 102 can wait for additional files to become available (e.g., from a new submission to a software distribution service) and continually update the inverted index 116.

Figure 3:
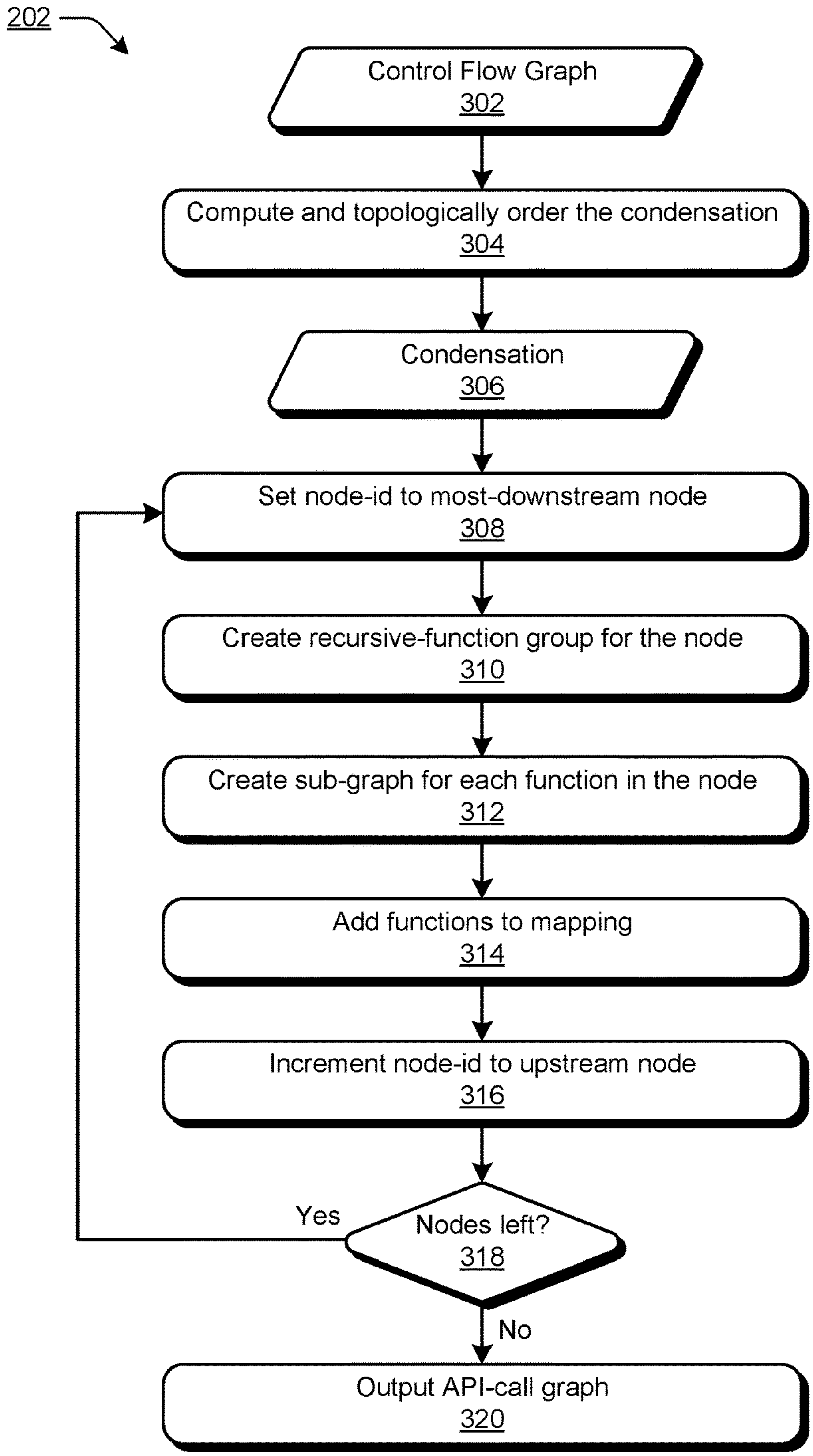
FIG. 3 illustrates an example flow diagram for generating API-call graphs for executable files or shared library files of a software package.

FIG. 3 illustrates an example flow diagram 202 for generating the API-call graphs 204 for the executable files 110 or the shared library files 112 of the software package 108. The operations of the flow diagram 202 are described in the context of the computing device 102 of FIG. 1. The operations of the flow diagram 202 may be performed in a different order or with additional or fewer operations.

The computing device 102 can convert a binary of an executable file 110 or a shared library file 112 into a control flow graph 302. The control flow graph 302 represents, using graph notation, paths that might be traversed during the execution of the executable file 110 or the shared library file 112.

At 304, the computing device 102 computes a condensation 306 of the control flow graph 302. The condensation 306 converts mutually-recursive functions into single graph nodes, resulting in a directed acyclic graph for the binary. Each node in the directed acyclic graph includes a unique identifier. The computing device 102 can also topologically order the condensation 306.

Within each recursive-function group, the computing device 102 tracks completed functions. The computing device 102 can also track the recursive-function groups that include each completed function. A function is complete when the functions in the recursive-function group are complete. Each recursive-function group tracks the identifiers of nodes it contains.

The topological ordering of the condensation 306 assures that calls to upstream functions (which are incomplete) do not occur, while downstream functions are complete. As a result, only functions within the current node are potentially incomplete but callable.

At 308, the computing device 102 iterates through the nodes of the condensation 306. The computing device 102 can start by setting the node-id to a most-downstream node. At 310, the computing device 102 creates a new recursive-function group for the current node and populates the recursive-function group with new entry nodes and exit nodes for each function.

At 312, for each function in the node, a subgraph is created for each basic block, linking the functions with epsilon transitions based on the control flow. In this context, an epsilon (c) transition is a no-operations transition, which occurs, in the sense of automata theory, without consuming an input symbol. Within a basic block, the control flow is sequential, except in the case of function calls.

The computing device 102 translates instructions within the basic blocks to transitions as follows: (1) map an assembly-level API-call instruction to the corresponding API call; (2) map a function call through a procedure-linkage table to an API-call based on the name of the imported function; (3) map a function-call instruction to the subgraph corresponding to its target; and (4) convert all other instructions to ε-transitions or omit them altogether. The computing device 102 can map function-call instructions to subgraphs as follows: (a) if a function is in the current recursive-function group, add an ε-transition to its entry node and from its exit node; or (b) treat the called function as inlined by making a copy of its recursive-function group in the current recursive-function group. The copy is linked-in with an ε-transition added to its entry node and from its exit node.

At 314, after processing the functions in the node, the computing device 102 adds the functions to a mapping of recursive-function groups. At 316, the computing device 102 increments the node-id to the immediately-upstream node, and, if nodes remain at 318, iterates through the remaining nodes.

In this context, an upstream node corresponds to a node that is not downstream. For example, consider a control flow graph 302 with node a that has two child-nodes b and c, resulting in a topological order of [a, b, c]. A movement from node c to node b is considered an upstream movement, even though nodes b and c are siblings in the graph-theoretic sense.

At 320, when the nodes of the condensation 306 are exhausted, the computing device 102 creates the API-call graphs 204 for output. The computing device 102 can also output a set of potential asynchronous entry points into the API-call graphs 204. The computing device 102 moves each recursive-function group into the respective API-call graphs 204 by moving the transitions and each of the function entry nodes to the entry points of the respective API-call graph 204. As a result of the condensation 306, a function can only call other functions that are either within the same node or in more-downstream nodes. In this way, functions can have their respective API-call graph 204 inlined into upstream callers, which effectively provides return-address tracing and produces a more-accurate API-call graph 204. By keeping track of node identifiers within recursive-function groups, the computing device 102 can efficiently assign new node identifiers with a single update pass over the transitions.

Figure 4:
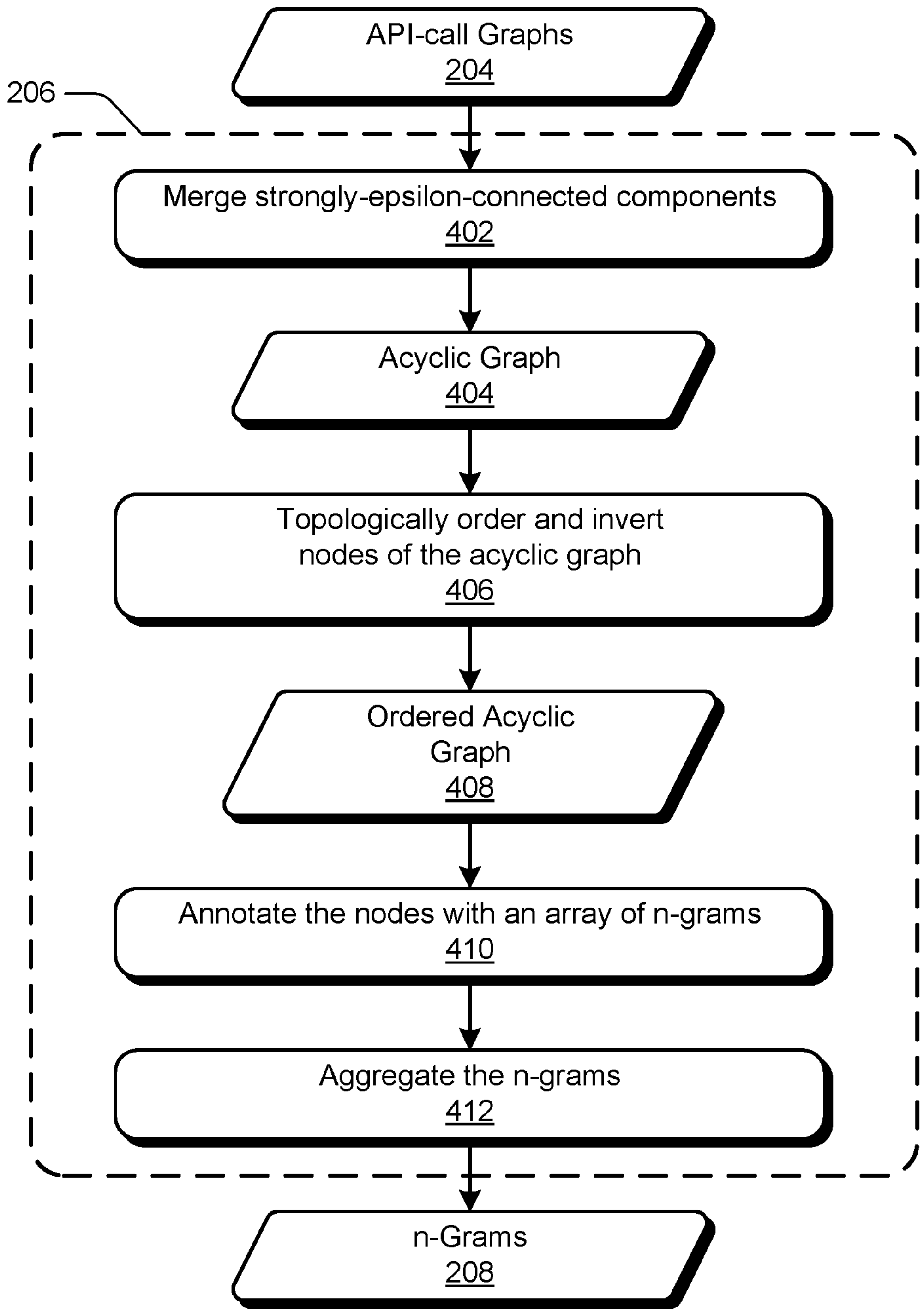
FIG. 4 illustrates an example flow diagram for computing n-grams from API-call graphs.

FIG. 4 illustrates an example flow diagram 206 for computing the n-grams 208 from the API-call graphs 204. The operations of the flow diagram 206 are described in the context of the computing device 102 of FIG. 1. The computing device 102 can use an AI integrator to extract the n-grams 208 from the API-call graphs 204 contained in the executable files 110 and the shared library files 112. The operations of the flow diagram 206 may be performed in a different order or with additional or fewer operations.

At 402, the AI integrator can use a recursive algorithm to annotate each node of the API-call graphs 204 with their incoming n-grams using dynamic programming and graph traversals. The algorithm merges strongly-E-connected components to make an ε-subgraph acyclic graph 404.

At 406, the AI integrator can topologically order and invert the nodes of the E-subgraph acyclic graph 404 to obtain an ordered acyclic graph 408. The ordered acyclic graph 408 maps a node to its non-E predecessors (e.g., the source node and API call). The AI integrator can use the operations 402 and 406 as preparation steps for utilizing the recursive algorithm.

At 410, for the recursive base case (e.g., if n=0), the AI integrator annotates each node with a set containing the empty 0-gram. Otherwise, the AI integrator annotates each node with its incoming (n−1)-grams. The AI integrator then annotates each source node and destination node with an array of n-grams, including non-c predecessors and c successors.

At 412, the AI integrator aggregates the n-grams 208 for each API-call graph 204. The AI integrator can write the n-grams 208 to memory. The AI integrator can then directly output the n-grams 208 or output them as a set of string features in word form.

Figure 5:
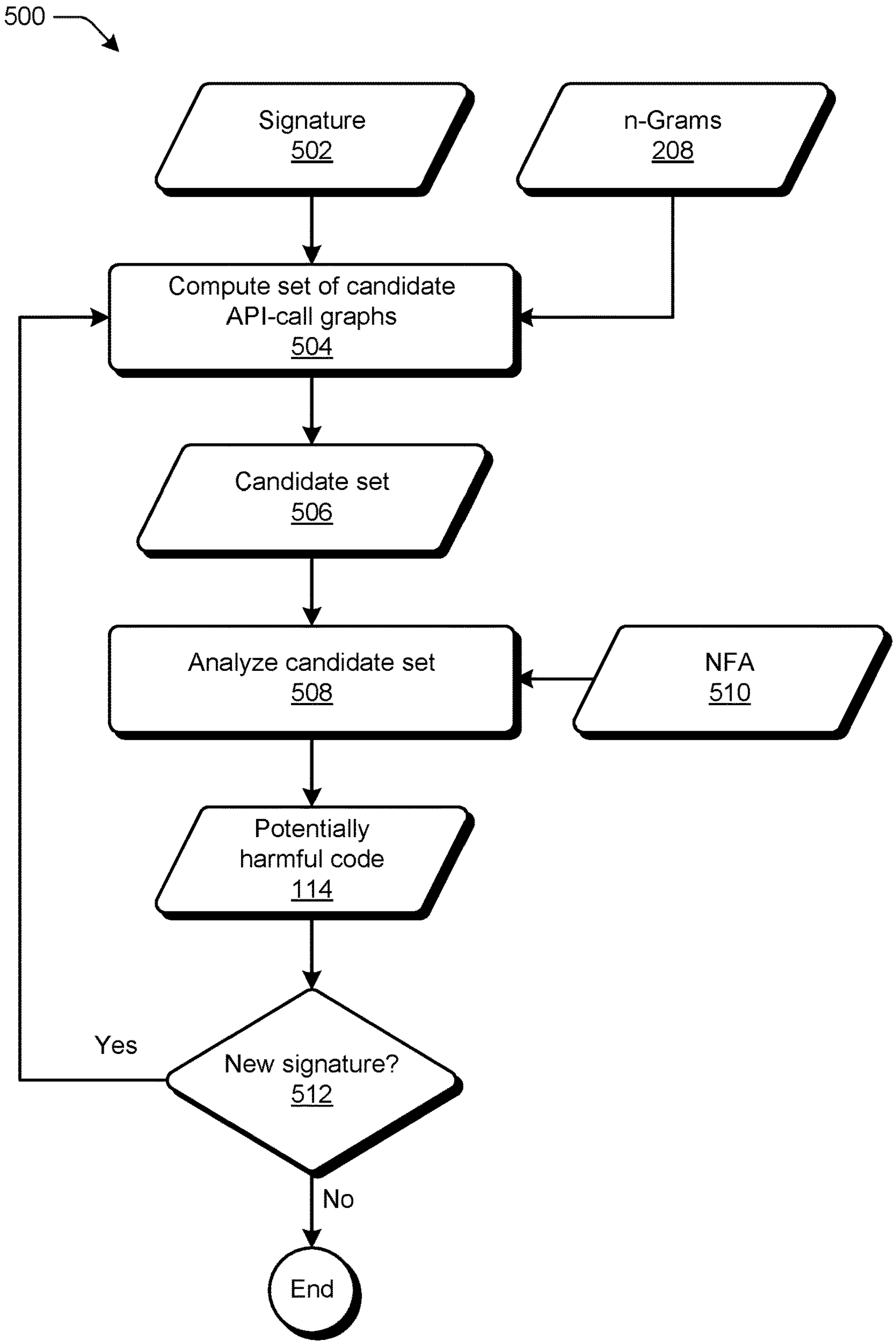
FIG. 5 illustrates an example flow diagram for detecting potentially harmful code in a software package using API-call n-grams.

FIG. 5 illustrates an example flow diagram 500 for detecting the potentially harmful code 114 in the software package 108 using API-call n-grams. The operations of the flow diagram 500 are described in the context of the computing device 102 and the software package 108 of FIG. 1.

At 504, the computing device 102 can identify a set of candidate API-call graphs 506 from among the API-call graphs 204. The computing device 102, using one or more heuristics and the n-grams 208, identifies the set of candidate API-call graphs 506 as API-call graphs that potentially contain a path matching a signature 502. The signature 502 can be an arbitrary NFA with epsilon-moves, which represents potentially harmful behavior (e.g., an exploit of a system or software vulnerability). The identification of the set of candidate API-call graphs 506 is described in more detail with respect to FIG. 6.

At 508, the computing device 102 can retrieve the set of candidate API-call graphs 506 from the inverted index 116. The computing device 102 then compares, using a matching algorithm, the set of candidate API-call graphs 506 to an NFA 510 that represents the behavior of potentially harmful code. The comparison allows the computing device 102 to detect whether the set of candidate API-call graphs 506 includes an executable file 110 or a shared library file 112 within the software package 108 that contains the potentially harmful code 114. To perform the comparison, the computing device 102 can compute respective products of the NFA and each API-call graph 204 of the set of candidate API-call graphs 506. The computing device 102 can then determine, using a graph traversal (e.g., a breadth-first search or a depth-first search), whether the respective products indicate that the set of candidate API-call graphs 506 include a file that matches the behavior of the potentially harmful code 114.

To determine a match between an API-call graph 204 of the set of candidate API-call graphs 506 and the NFA 510, the computing device 102 considers the API-call graph 204 as an NFA with all states accepting. The computing device 102 computes a synchronized product of the two NFAs, which is defined such that determining a match of the API-call graph 204 to the NFA 510 is equivalent to determining whether the synchronized product has a non-empty acceptance set. In this manner, matching the API-call graph 204 to the NFA 510 is reduced to a simple reachability problem solvable in linear time and space, for example, using a breadth-first or depth-first search.

The NFA is represented as a five-tuple (Q1, Σ, Δ1, q1, F1) illustrated in Equation 1:

$$(Q_1,\Sigma,\Delta_1,q_1,F_1),\text{ where} \tag{1}$$

$Q_1$ is the set of states of the NFA 510;

Σ is the set of input symbols to the NFA 510 (e.g., the alphabet);

$\Delta_1$ is a transition function between states of the NFA 510: $\Delta_1$: $Q_1\times(\Sigma\cup\{\epsilon\})\rightarrow 2^{Q_1}$, ϵ being the empty string;

$q_1\in Q_1$ is an initial start state of the NFA 510; and $F_1\subseteq Q_1$ is a set of accepting states of the NFA 510.

Similarly, the API-call graph 204 is represented by another NFA, which is denoted ($Q_2$, Σ, $\Delta_2$, $q_2$, $F_2$).

The synchronized product of the two NFAs is defined as an NFA which shares the alphabet of the constituent NFAs, whose set of states is the Cartesian product of the two constituent NFAs, and which has a transition function as defined in Equation 2:

$$\text{Synchronized product of }(Q_1,\Sigma,\Delta_1,q_1,F_1)\text{ and }(Q_2,\Sigma,\Delta_2,q_2,F_2)=(Q_1\times Q_2,\Sigma,\Delta',(q_1,q_2),F_1\times F_2),\text{ where} \tag{2}$$

$\Delta'=\{((s_1, s_2), \epsilon, (t_1, s_2))|s_2\in Q_2\wedge(s_1, \epsilon, t_1)\in\Delta_1\}\cup\{((s_1, s_2), \epsilon, (s_1, t_2))|s_1\in Q_1\wedge(s_2, \epsilon, t_2)\in\Delta_2\}\cup\{((s_1, s_2), a, (t_1, t_2))|a\neq\epsilon\wedge(s_1, a, t_1)\in\Delta_1\wedge(s_2, a, t_2)\in\Delta_2\}$.

The synchronized product of two NFAs is a restriction of their Cartesian product such that only transitions where both automata recognize the same input symbol are allowed. The first two components of Δ' allow each of the two NFAs to make an epsilon-move independently, while the third component allows the NFAs to recognize the same symbol in lockstep.

Explicit computation of Δ' uses $|Q_1|\times|Q_2|$ states and up to $|\Delta_1|\times|\Delta_2|$ transitions. In practice, many of these states and transitions are unreachable. The computing device 102 can, therefore, compute the synchronized product on the fly, ensuring that only necessary states and transitions are computed. To efficiently compute the transitions outgoing from a state pair, the computing device 102 uses one automaton to support efficiently finding the outgoing transitions from its states. Thus, the computing device 102 efficiently computes $\Delta_1(s)$ on the fly as $\Delta_1(s)=\{(a_1, t_1)|(s, a_1, t_1)\in\Delta_1\}$. The other automaton similarly supports finding the outgoing transitions from a state with a given label. Thus, the computing device 102 efficiently computes $\Delta_2(s, a)$ on the fly as $\Delta_2(s, a)=\{t_2|(s, a, t_2)\in\Delta_2\}$. In this manner, the computing device 102 can compute transitions from a state $(s_1, s_2)$ as shown in Equation 3 below:

$$\text{for each }(a_1,t_1)\in\Delta_1(s_1): \tag{3}$$

if $a_1=\epsilon$, then $((s_1, s_2), \epsilon, (t_1, s_2))$ is a transition.

if $a_1\neq\epsilon$, then for each $t_2\in\Delta_2(s_2, a_1)$: $((s_1, s_2), a_1, (t_1, t_2))$ is a transition;

$t_2\in\Delta_2(s_2, \epsilon)$: $((s_1, s_2), \epsilon, (s_1, t_2))$ is a transition.

On-the-fly computation of the synchronized product enables not only finite-state but also some infinite-state systems to be processed in finite time. For example, NFAs with finite branching, e.g., where $\Delta_1(s)$ is finite for all states reachable from $q_1$, make progress, and a breadth-first search enables accepting states to be found in finite time if a finite string is accepted. Another implication is that the alphabet $\Sigma$ need not be finite, e.g., $\Sigma$ is a set of Unicode Transformation Format-8 (UTF-8) strings (not characters).

Compute-intensive and explicit representation of $\Delta_2(s, a)$, e.g., with an adjacency matrix, is obviated. The ability of one of the automata to efficiently and on-the-fly compute $\Delta_2(s, a)$ using $\Delta_2(s, a)=\{t_2|(s, a, t_2)\in\Delta_2\}$ enables the computing device 102 to efficiently operate on and represent other abstractions such as counter-extended NFAs. The counter-extended NFAs enable the computing device 102 to efficiently match bounded repetitions, including the regular expression (regex) operator {m,n}, which matches a regular expression at least m, but no more than n, times. The computing device 102 traditionally performs this matching by creating an automaton with n subunits corresponding to the repeated expression. With on-the-fly computation, the computing device 102 represents the operator symbolically and generates the states only if needed. For example, traditional regex engines can take a long time to compile a {2,1000000000}, even for matching short strings such as b, a, and aaa. With the described techniques, the computing device 102 performs checking in time and space proportional to the length of the string.

At 512, the computing device 102 determines whether there are additional or new signatures 502. If there are additional signatures, the computing device 102 returns to the operation 504. If there are no additional signatures, the computing device 102 terminates the operations of the flow diagram 500.

Figure 6:
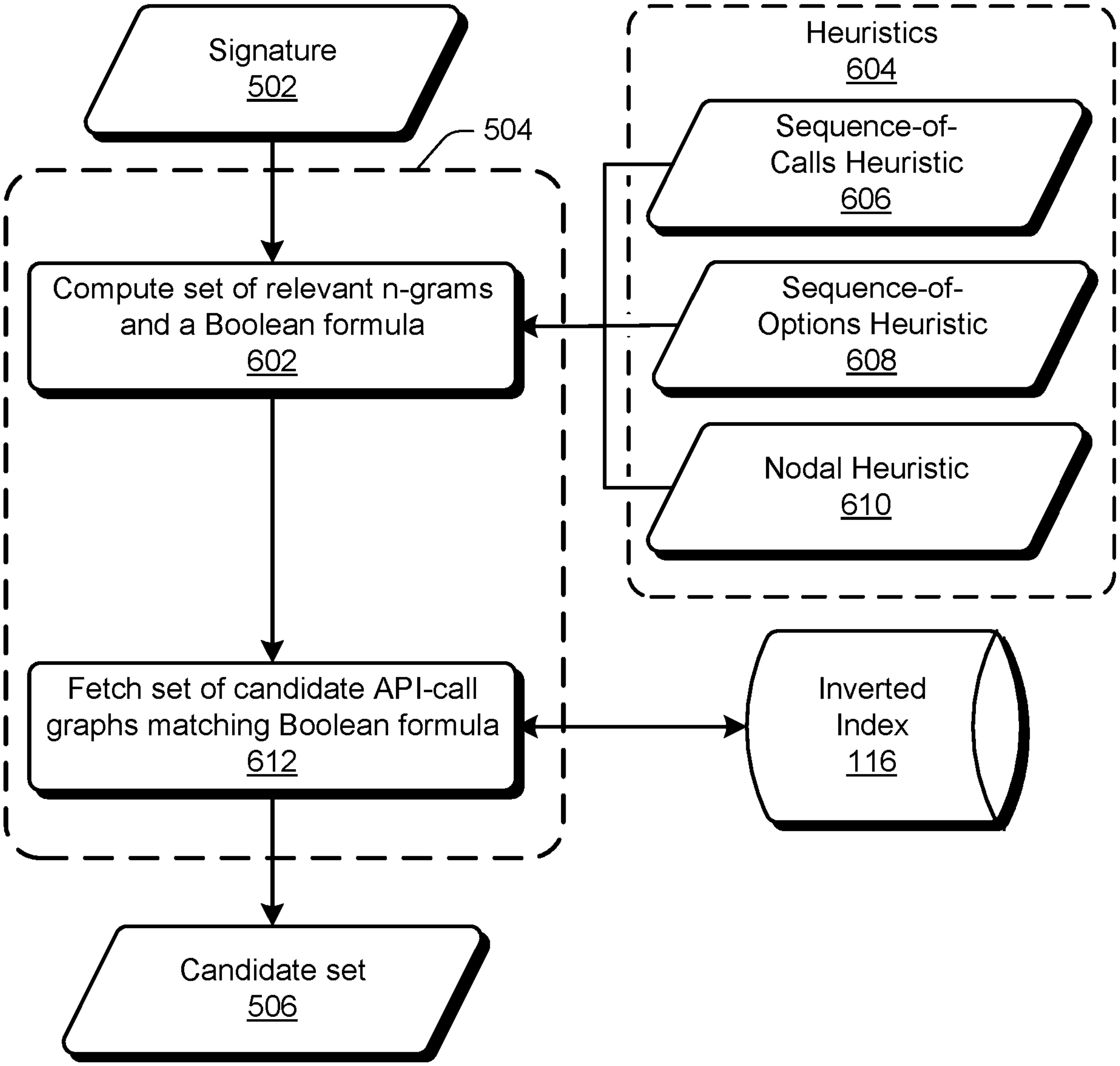
FIG. 6 illustrates an example flow diagram for identifying a set of candidate API-call graphs.

FIG. 6 illustrates an example flow diagram 504 for identifying the set of candidate API-call graphs 506. The operations of the flow diagram 504 are described in the context of the computing device 102 of FIG. 1. The operations of the flow diagram 504 may be performed in a different order or with additional or fewer operations.

At 602, given the signature 502, the computing device 102 computes a set of relevant n-grams and a Boolean formula as a representation of the potentially-harmful behavior. The computing device 102 uses a heuristic 604 to compute the set of relevant n-grams and the Boolean formula.

As an example, the heuristic 604 can be a sequence-of-calls heuristic 606, which utilizes a sequence of calls, potentially in a loop, to generate the Boolean formula that contains a set of relevant n-grams. The set of relevant n-grams represent the sequence of calls in the signature 502. For a file to match a formula generated using the sequence-of-calls heuristic 606, each of the n-grams in the signature 502 must be present. The computing device 102 can determine whether the set of relevant n-grams are present using a sliding window. As an example, if the signature 502 is the expression "(abc){2+}," the Boolean formula for a 2-gram system is "ab AND be AND ca."

As another example, the heuristic 604 can be a sequence-of-options heuristic 608, which utilizes a sequence of options in a loop. Each option can be satisfied by one or, in some situations, none of a set of specified calls. For each element in the sequence, the computing device 102 computes the outgoing optional n-grams and combines them together in a disjunctive (OR) function. The computing device 102 then combines the formulas of each element in a conjunctive (AND) function with any relevant n-grams. For example, if the signature 502 is the expression "(a(b|c) d){2+}," the Boolean formula for a 2-gram system is "(ab OR ac) AND (bd OR cd) AND da."

Other heuristics 604 can be developed for specific cases and can be defined using n-grams. In other implementations, a nodal heuristic 610 can be used. In the nodal heuristic 610, the signature 502 can be treated as an API-call graph, and the computing device 102 computes the n-grams going into a node and/or out of a node. In such a situation, the computing device 102 searches for a set of n-grams entering an entry node and a set of n-grams exiting an exit node and computes the set of candidate API-call graphs 506 by determining the API-call graphs 204 that contain at least one of the n-grams entering the entry node and at least one of the n-grams exiting the exit node.

At 612, the computing device 102 fetches the candidate set of API-call graphs 506 from the inverted index 116 by determining the API-call graphs 204 that match the Boolean formula.

Example Methods

FIG. 7 is a flowchart 700 illustrating example operations to index a software package and detect potentially harmful code using API-call n-grams. The operations of the flowchart 700 are described in the context of the computing device 102 of FIG. 1. The operations of the flowchart 700 may be performed in a different order or with additional or fewer operations.

At 702, API-calls are generated from binaries of a software package. For example, the computing device 102 generates the API-call graphs 204 from binaries of the executable files 110 and the shared library files 112 in the software package 108.

At 704, n-grams are computed from the API-call graphs. For example, the computing device 102 computes the n-grams 208 from the API-call graphs 204.

At 706, the n-grams are added to an inverted index that maps each of the n-grams to a respective identifier of the API-call graphs to enable locating of individual API-call graphs. For example, the computing device 102 adds the n-grams 208 to the inverted index 116. The inverted index 116 maps the n-grams 208 to a respective identifier of the API-call graphs 204 in which the n-grams 208 can be found. The inverted index 116 enables locating of individual API-call graphs 204 based on a query using the n-grams 208.

At 708, a set of candidate API-call graphs, from among the API-call graphs, that match a signature are identified. The signature represents behavior of potentially harmful code. For example, the computing device 102 identifies, from among the API-call graphs 204, the set of candidate API-call graphs 506 that match the signature 502. The signature 502 represents behavior of potentially harmful code.

At 710, the set of candidate API-call graphs is retrieved from the inverted index. For example, the computing device 102 retrieves the set of candidate API-call graphs 506 from the inverted index 116.

At 712, the set of candidate API-call graphs is compared, using a matching algorithm, to a non-deterministic finite automaton (NFA) to detect whether a file within the software package matches the behavior of potentially harmful code. The NFA represents the behavior of potentially harmful code. For example, the computing device 102 compares the set of candidate API-call graphs 506 to the NFA 510 to detect whether a file within the software package 108 matches the behavior of potentially harmful code 114. The NFA 510 represents the behavior of potentially harmful code 114.

Example Implementation

Figure 8:
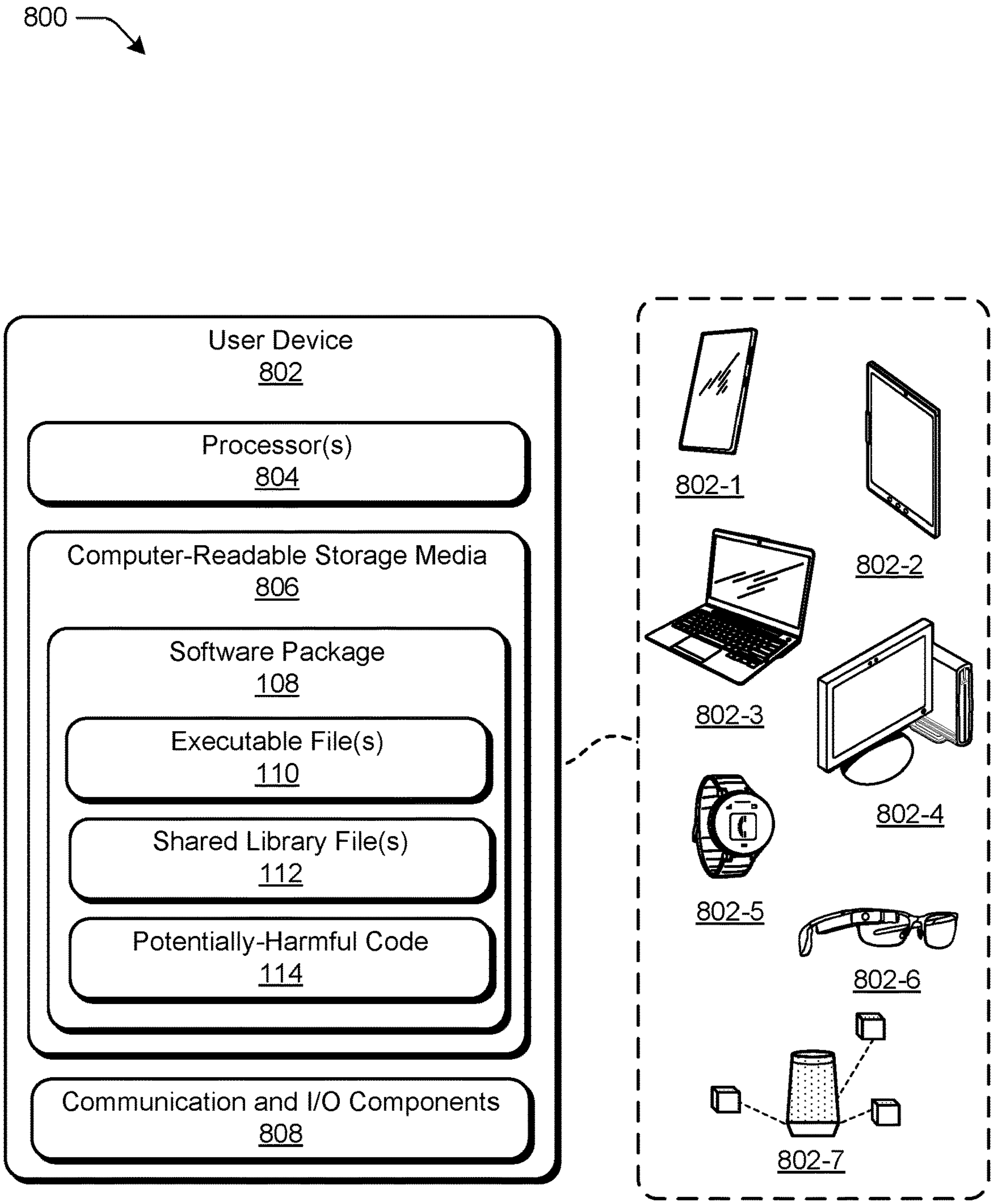
FIG. 8 illustrates an example device diagram of a user device for which indexing a software package and detecting potentially harmful code using API-call n-grams can be implemented.

FIG. 8 illustrates an example device diagram 800 of a user device 802 for which indexing the software package 108 and detecting potentially harmful code using API-call n-grams can be implemented. The user device 802 may include additional functions and interfaces omitted from FIG. 8 for the sake of clarity.

The user device 802 can be a variety of consumer electronic devices. As non-limiting examples, the user device 802 can be a mobile phone 802-1, a tablet device 802-2, a laptop computer 802-3, a desktop computer 802-4, a computerized watch 802-5, a wearable computer 802-6, or a voice-assistant system 802-7.

The user device 802 includes one or more processors 804 and computer-readable storage media 806. The processor 804 can be a single-core processor or a multiple-core processor. The processor 804 functions as a central processor for the user device 802. The processor 804 can include other components, such as communication units (e.g., modems), input/output controllers, sensor hubs, system interfaces, and the like.

The CRM 806 includes any suitable storage device (e.g., random-access memory (RAM), static RAM (SRAM), dynamic RAM (DRAM), non-volatile RAM (NVRAM), read-only memory (ROM), Flash memory) to store device data of the user device 802. The device data can include user data, multimedia data, an operating system, and applications of the user device 802, which are executable by the processor 804 to enable communications and user interaction with the user device 802.

The CRM 806 also includes the software package 108. As described above, the software package 108 can be, for example, a collection of applications available for download to the user device 802. The software package 108 includes the executable files 110 and the shared library files 112.

Among the executable files 110 and the shared library files 112, the software package 108 can also include the potentially harmful code 114. For example, one or more of the executable files 110 or the shared library files 112 can include indicators of potentially harmful code or code that can potentially perform unwanted behavior on the user device 802. As described above, security engineers can index the software package 108 and detect the potentially harmful code 114 using API-call n-grams. In response to identifying the potentially harmful code 114, updates, patches, or other measurements, via communication and input/output (I/O) components 808, can be taken to remove or address the potentially harmful code 114 or its malicious, unwanted, or potentially harmful behavior.

The processor 804 is operatively coupled to the one or more communication and I/O components 808. The communication and I/O components 808 include data network interfaces that provide connection or communication links between the user device 802 and other data networks, devices, or remote systems (e.g., servers). The communication and I/O component 808 can couple the user device 802 to a variety of different types of components, peripherals, or accessory devices. Data input ports of the communication and I/O components 808 receive data, including image data, user inputs, communication data, audio data, video data, and the like. The communication and I/O components 808 can also enable wired or wireless communicating of device data between the user device 802 and other devices (e.g., the computing device 102), computing systems, and networks.

The one or more communication and I/O components 808 can include a display. The one or more communication and I/O components 808 can also include one or more sensors, for example, embedded within the display or as a separate component of the user device 802. The communication and I/O components 808 provide connectivity between the user device 802, a user, and other devices and peripherals in the outside world.

EXAMPLES

In the following section, examples are provided.

Example 1: A method comprising: generating API-call graphs from binaries of a software package; computing n-grams from the API-call graphs; adding the n-grams to an index that maps each of the n-grams to a respective identifier of the API-call graphs to enable locating of individual API-call graphs; identifying, from among the API-call graphs, a set of candidate API-call graphs that match a signature, the signature representing behavior of potentially harmful code; retrieving the set of candidate API-call graphs from the index; and comparing, using a matching algorithm, the set of candidate API-call graphs to a non-deterministic finite automaton (NFA) representing the behavior of potentially harmful code to detect whether a file within the software package matches the behavior of potentially harmful code.

Example 2: The method of example 1, wherein generating the API-call graphs from the binaries of the software package comprises: computing a respective condensation of a control flow graph of each of the binaries to convert mutually-recursive functions into nodes of a directed acyclic graph; topologically ordering the nodes of the condensation; iterating through a most-downstream node of the nodes for the condensation; creating a recursive-function group for each of the nodes, the recursive-function group comprising at least one entry node and at least one exit node for each of one or more functions in the recursive-function group; creating a subgraph for each of the one or more functions in the recursive-function group, the subgraph linking basic blocks of the one or more functions to epsilon transitions; adding each of the one or more functions in the recursive-function group to a map of recursive-function groups for the nodes; and outputting an API-call graph comprising the recursive-function group for each of the nodes.

Example 3: The method of any preceding example, wherein computing the n-grams from the API-call graphs comprises: merging strongly-epsilon-connected components of a respective API-call graph of the API-call graphs to generate an epsilon-subgraph acyclic graph of nodes of the API-call graph; topologically ordering the nodes according to an order of the nodes in the epsilon-subgraph acyclic graph; inverting the epsilon-subgraph acyclic graph from the nodes to respective non-epsilon predecessors; annotating, using a recursive algorithm, the nodes with an array of n-grams, including the non-epsilon predecessors and epsilon successors; aggregating the n-grams; and outputting a set of n-grams for the respective API-call graph.

Example 4: The method of any preceding example, wherein the n-grams comprise n-grams of a customizable length and the index comprises an inverted index.

Example 5: The method of any preceding example, wherein the n-grams comprise at least one of a one-gram and a two-gram.

Example 6: The method of any preceding example, wherein the signature represents an arbitrary NFA with epsilon-moves.

Example 7: The method of any of examples 1 through 5, wherein: the signature comprises a set of n-grams that represents a sequence of calls; and identifying the set of candidate API-call graphs comprises determining the API-call graphs that include the set of n-grams.

Example 8: The method of any of examples 1 through 5, wherein: the signature comprises a set of optional n-grams and relevant n-grams that represents a sequence of options in a loop; and identifying the set of candidate API-call graphs comprises determining the API-call graphs that include at least one of the optional n-grams and each of the relevant n-grams.

Example 9: The method of any of examples 1 through 5, wherein: the signature comprises a set of n-grams entering an entry node and n-grams exiting an exit node; and identifying the set of candidate API-call graphs comprises determining the API-call graphs that include at least one of the n-grams entering the entry node and at least one of the n-grams exiting the exit node.

Example 10: The method of any preceding example, wherein the set of candidate API-call graphs comprises NFAs with all states accepting.

Example 11: The method of example 10, wherein comparing the set of candidate API-call graphs to the NFA comprises: computing respective products of the NFA and each NFA with all states accepting of the set of candidate API-call graphs; and determining, using a graph traversal, whether the respective products indicate that the NFAs with all states accepting include a binary that matches the behavior of potentially harmful code.

Example 12: The method of any preceding example, wherein the binaries comprise executable files, shared library files, or a combination thereof.

Example 13: A system comprising means for performing the method of any of the preceding examples.

Example 14: A non-transitory computer-readable storage medium comprising instructions that, when executed, configure a processor of a computing device to perform the method of any of examples 1 through 12.

CONCLUSION

While various configurations and methods for indexing and detecting potentially harmful code using API-call n-grams have been described in language specific to features and/or methods, it is to be understood that the subject of the appended claims is not necessarily limited to the specific features or methods described. Rather, the specific features and methods are disclosed as non-limiting examples of indexing and detecting potentially harmful code using API-call n-grams.

What is claimed is:

1. A method comprising:

generating API-call graphs from binaries of a software package, wherein generating the API-call graphs comprises converting control flow graphs of the binaries into directed acyclic graphs by condensing mutually recursive functions into nodes;

computing n-grams of a customizable length from the API-call graphs, wherein computing the n-grams comprises: merging nodes of each API-call graph that are connected by epsilon transitions to form an acyclic graph, topologically ordering the nodes of the acyclic graph, and recursively annotating each node with arrays of n-grams representing sequences of API calls along paths in the acyclic graph;

adding the n-grams to an inverted index that maps each of the n-grams to a respective identifier of the API-call graphs to enable locating of individual API-call graphs;

identifying, from among the API-call graphs based on the n-grams, a set of candidate API-call graphs that match a signature, the signature comprising a set of n-grams that represents a sequence of calls and is represented as a non-deterministic finite automaton (NFA) with epsilon-moves, the signature representing behavior of potentially harmful code;

retrieving the set of candidate API-call graphs from the inverted index;

comparing, using a matching algorithm, the set of candidate API-call graphs to the NFA representing the behavior of potentially harmful code by computing, for each candidate API-call graph, a synchronized product automaton whose set of states is the cartesian product of the states of the NFA and the states of the candidate API-call graph, and whose transitions comprise: (i) epsilon moves for either automaton, and (ii) synchronized transitions on matching input symbols; and determining, via a graph traversal of the synchronized product automaton, whether any candidate API-call graph matches the behavior of potentially harmful code, and in response to a match, indicating that the software package potentially contains harmful code.

2. The method of claim 1, wherein generating the API-call graphs from the binaries of the software package comprises:

computing a respective condensation of a control flow graph of each of the binaries to convert mutually recursive functions into nodes of a directed acyclic graph;

topologically ordering the nodes of the condensation;

iterating through a most-downstream node of the nodes for the condensation;

creating a recursive-function group for each of the nodes, the recursive-function group comprising at least one entry node and at least one exit node for each of one or more functions in the recursive-function group;

creating a subgraph for each of the one or more functions in the recursive-function group, the subgraph linking basic blocks of the one or more functions to epsilon transitions;

adding each of the one or more functions in the recursive function group to a map of recursive-function groups for the nodes; and outputting an API-call graph comprising the recursive function group for each of the nodes.

3. The method of claim 1, wherein the n-grams comprise at least one of a one-gram and a two-gram.

4. The method of claim 1, wherein the signature represents an arbitrary NFA with epsilon-moves.

5. The method of claim 1, wherein: the signature comprises a set of optional n-grams and relevant n-grams that represents a sequence of options in a loop; and identifying the set of candidate API-call graphs comprises determining the API-call graphs that include at least one of the optional n-grams and each of the relevant n-grams.

6. The method of claim 1, wherein: the signature comprises a set of n-grams entering an entry node and n-grams exiting an exit node; and identifying the set of candidate API-call graphs comprises determining the API-call graphs that include at least one of the n-grams entering the entry node and at least one of the n-grams exiting the exit node.

7. The method of claim 1, wherein the set of candidate API-call graphs comprises NFAs with all states accepting.

8. The method of claim 7, wherein comparing the set of candidate API-call graphs to the NFA comprises: computing respective products of the NFA and each NFA with all states accepting of the set of candidate API-call graphs; and determining, using a graph traversal, whether the respective products indicate that the NFAs with all states accepting include a binary that matches the behavior of potentially harmful code.

9. The method of claim 1, wherein the binaries comprise executable files, shared library files, or a combination thereof.

10. A computing device comprising a processor configured to:

generate API-call graphs from binaries of a software package, wherein generating the API-call graphs comprises converting control flow graphs of the binaries into directed acyclic graphs by condensing mutually recursive functions into nodes;

compute n-grams of a customizable length from the API-call graphs, wherein computing the n-grams comprises: merging nodes of each API-call graph that are connected by epsilon transitions to form an acyclic graph, topologically ordering the nodes of the acyclic graph, and recursively annotating each node with arrays of n-grams representing sequences of API calls along paths in the acyclic graph;

add then-grams to an inverted index that maps each of then-grams to a respective identifier of the API-call graphs to enable locating of individual API-call graphs;

identify, from among the API-call graphs based on the n-grams, a set of candidate API-call graphs that match a signature, the signature comprising a set of n-grams that represents a sequence of calls and is represented as a non-deterministic finite automaton (NFA) with epsilon-moves, the signature representing behavior of potentially harmful code;

retrieve the set of candidate API-call graphs from the inverted index; and compare, using a matching algorithm, the set of candidate API-call graphs to the NFA representing the behavior of potentially harmful code by computing, for each candidate API-call graph, a synchronized product automaton whose set of states is the Cartesian product of the states of the NFA and the states of the candidate API-call graph, and whose transitions comprise: (i) epsilon-moves for either automaton, and (ii) synchronized transitions on matching input symbols; and determining, via a graph traversal of the synchronized product automaton, whether any candidate API-call graph matches the behavior of potentially harmful code, and in response to a match, indicating that the software package potentially contains harmful code.

11. A non-transitory computer-readable storage medium comprising instructions that, when executed, configure a processor of a computing device to:

generate API-call graphs from binaries of a software package, wherein generating the API-call graphs comprises converting control flow graphs of the binaries into directed acyclic graphs by condensing mutually recursive functions into nodes;

compute n-grams of a customizable length from the API-call graphs, wherein computing the n-grams comprises: merging nodes of each API-call graph that are connected by epsilon transitions to form an acyclic graph, topologically ordering the nodes of the acyclic graph, and recursively annotating each node with arrays of n-grams representing sequences of API calls along paths in the acyclic graph;

add then-grams to an inverted index that maps each of then-grams to a respective identifier of the API-call graphs to enable locating of individual API-call graphs;

identify, from among the API-call graphs based on the n-grams, a set of candidate API-call graphs that match a signature, the signature comprising a set of n-grams that represents a sequence of calls and is represented as a non-deterministic finite automaton (NFA) with epsilon-moves, the signature representing behavior of potentially harmful code;

retrieve the set of candidate API-call graphs from the inverted index; and compare, using a matching algorithm, the set of candidate API-call graphs to the NFA representing the behavior of potentially harmful code by computing, for each candidate API-call graph, a synchronized product automaton whose set of states is the Cartesian product of the states of the NFA and the states of the candidate API-call graph, and whose transitions comprise: (i) epsilon-moves for either automaton, and (ii) synchronized transitions on matching input symbols; and determining, via a graph traversal of the synchronized product automaton, whether any candidate API-call graph matches the behavior of potentially harmful code, and in response to a match, indicating that the software package potentially contains harmful code.

12. The medium according to claim 11, wherein the n-grams comprise at least one of a one-gram and a two-gram.

13. The medium according to claim 11, wherein the signature represents an arbitrary NFA with epsilon-moves.

14. The medium according to claim 11, wherein: the signature comprises a set of optional n-grams and relevant n-grams that represents a sequence of options in a loop; and identifying the set of candidate API-call graphs comprises determining the API-call graphs that include at least one of the optional n-grams and each of the relevant n-grams.

15. The medium according to claim 11, wherein: the signature comprises a set of n-grams entering an entry node and n-grams exiting an exit node; and identifying the set of candidate API-call graphs comprises determining the API-call graphs that include at least one of the n-grams entering the entry node and at least one of the n-grams exiting the exit node.

16. The medium according to claim 11, wherein the set of candidate API-call graphs comprises NFAs with all states accepting.

17. The medium according to claim 16, wherein comparing the set of candidate API-call graphs to the NFA comprises: computing respective products of the NFA and each NFA with all states accepting of the set of candidate API-call graphs; and determining, using a graph traversal, whether the respective products indicate that the NFAs with all states accepting include a binary that matches the behavior of potentially harmful code.

18. The medium according to claim 11, wherein the binaries comprise executable files, shared library files, or a combination thereof.

* * * * *